April 18, 1961 G. C. HANNAGAN 2,980,190
CROP THINNER
Filed Jan. 3, 1958 2 Sheets-Sheet 1

Gerald C. Hannagan
INVENTOR.

April 18, 1961 G. C. HANNAGAN 2,980,190
CROP THINNER
Filed Jan. 3, 1958 2 Sheets-Sheet 2

Gerald C. Hannagan
INVENTOR.

United States Patent Office 2,980,190
Patented Apr. 18, 1961

2,980,190
CROP THINNER

Gerald C. Hannagan, Tracy, Calif., assignor of small percentages to various assignees Filed Jan. 3, 1958, Ser. No. 706,958

4 Claims. (Cl. 172—58)

This invention relates in general to new and useful improvements in farm machinery, and more specifically to a crop thinner device adapted to be pulled by tractors.

In the planting of certain crops, such as cotton, sugar beets and the like, it has been the practice to plant continuous rows of seeds. Then, after the seeds have matured into small plants, the plants are thinned so that only approximately every fourth or fifth plant remains. By so sowing the seed and then removing the excess plants, a complete crop is assured each planting. However, once the extra plants have begun to grow, it is a time consuming task removing these extra plants.

It is therefore the primary object of this invention to provide an improved crop thinner device far tractors, the device being of such a nature whereby it may be conveniently drawn by a tractor and may be operated by driving the tractor down along the row of the crop.

Another object of this invention is to provide an improved crop thinner which is in the form of a plurality of hoe members mounted for oscillatory movement, there being provided means for oscillating the hoe members in order that they may perform an advantageous hoeing operation.

A further object of this invention is to provide a crop thinning device utilizing two pair of hoe members which operate 180° out of phase.

A further object of this invention is the provision of variable speed transmission means for oscillating the hoe members at selected desired rates.

In accordance with the above stated objects, below is described a crop thinning device which is adapted to be pulled by a tractor. The device includes a supporting frame and a rotatable shaft longitudinal of the frame driven by power take-off means connected to the tractor. Variable speed pulley means are driven by the shaft and are operatively connected to a pair of sprocket gears which operate hoe members for thinning rows of crops as the tractor pulling the device drives along the rows.

These together with other objects and advantages which will become subsequently apparent reside in the details of construction and operation as more fully hereinafter described and claimed, reference being had to the accompanying drawings forming a part hereof, wherein ilke numerals refer to like parts throughout, and in which:

Figure 1:
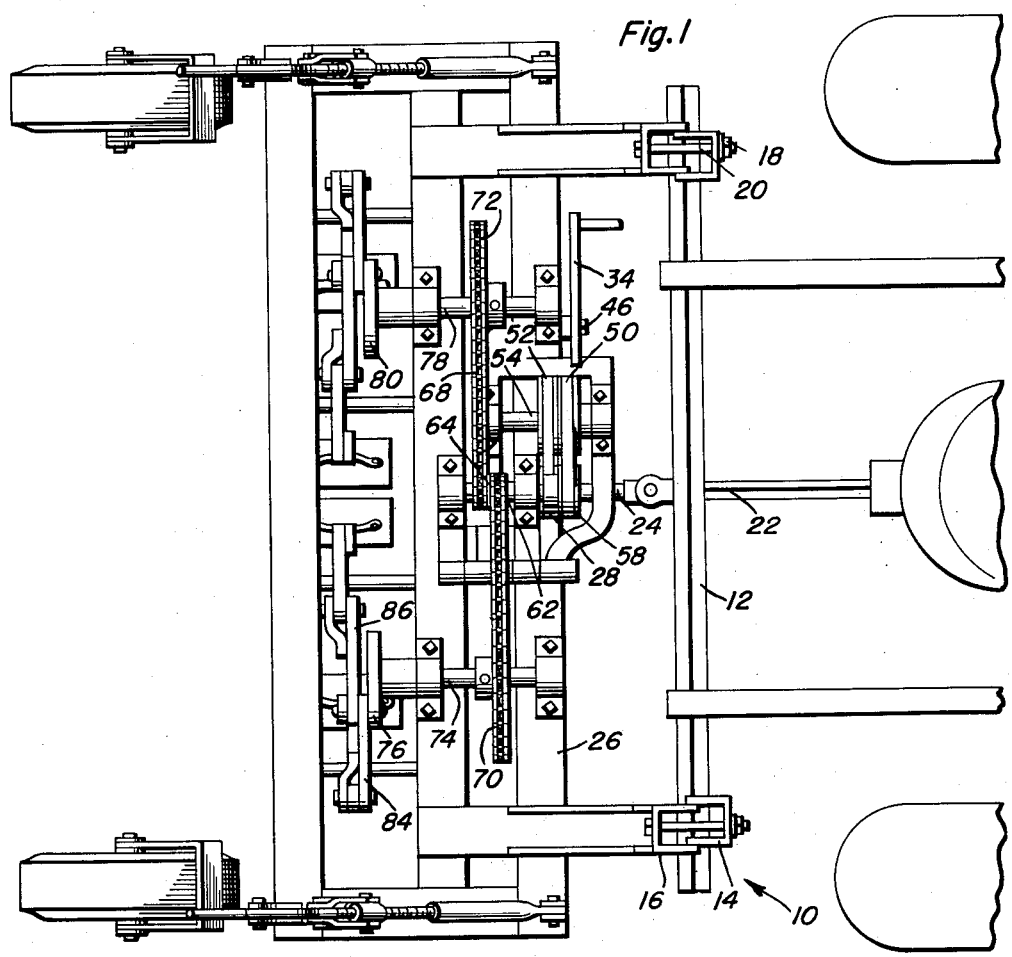
Figure 1 illustrates an elevational plan view of the device comprising this invention.
Figure 2:
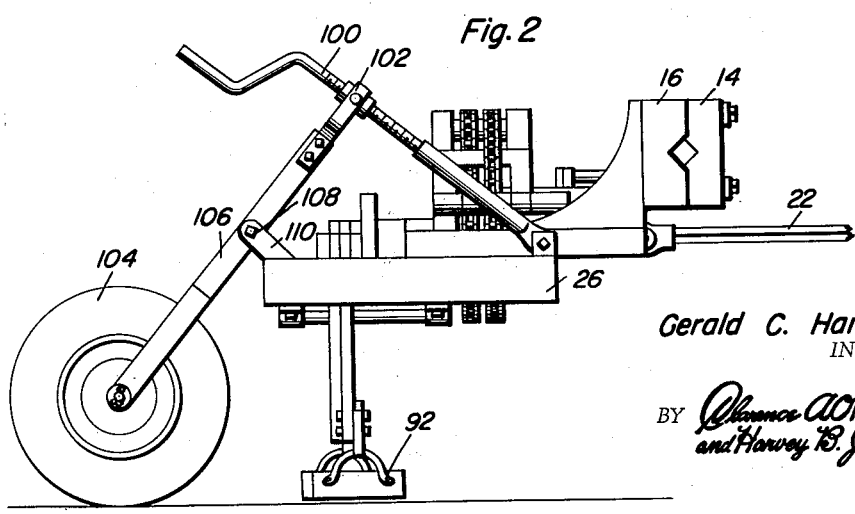
Figure 2 is an elevational side view of this invention.
Figure 3:
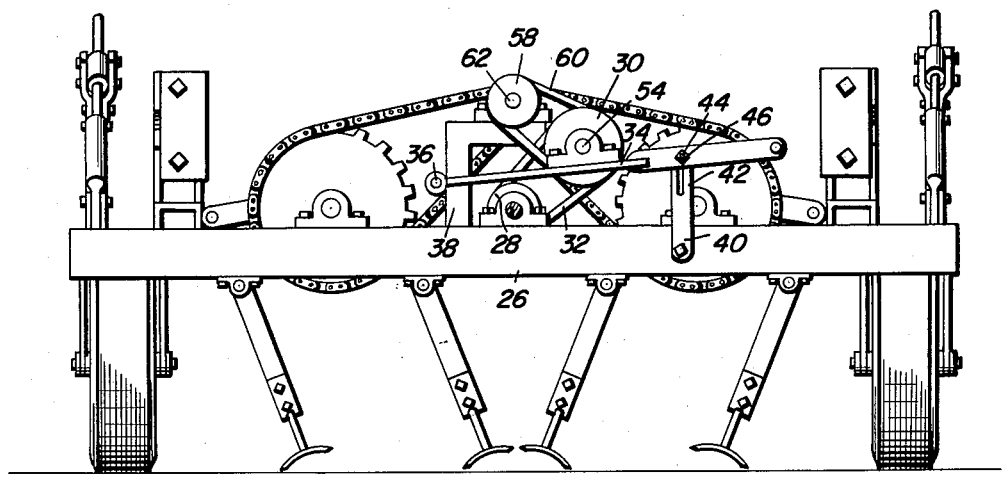
Figure 3 is an elevational front view of this invention.
Figure 4:
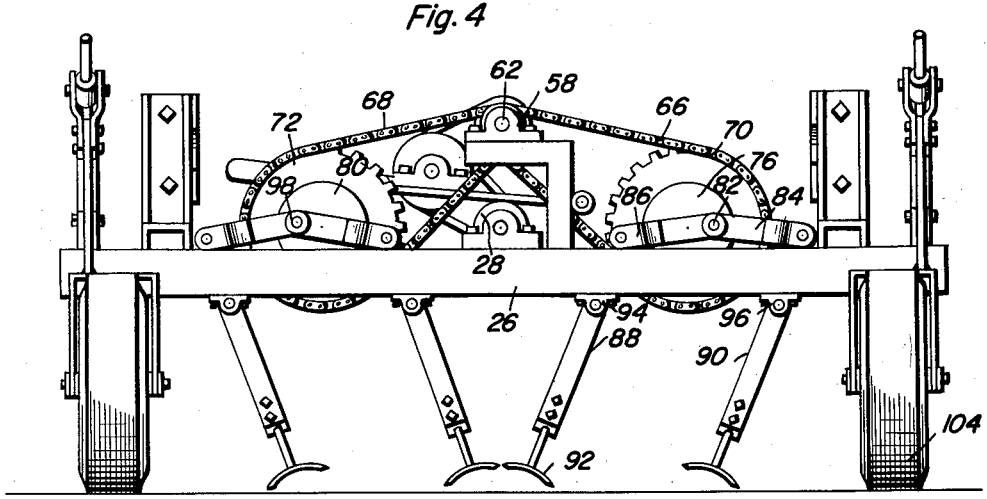
Figure 4 is an elevational rear view of this invention.
Figure 5:
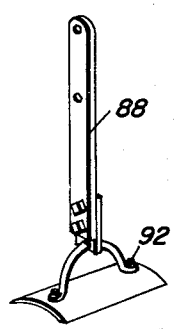
Figure 5 is a detailed perspective view illustrating the hoe members.

With continuing reference to the drawings, the numeral 10 generally represents the device comprising this invention adapted to be drawn by a tractor (not shown) having a drawbar 12 which fits between the jaw members 14 and 16 which are held together by nut 18 and bolt 20. It is also within the contemplation of this invention that the jaw members 14 and 16 be hydraulically controlled for the convenience of the user of the device of this invention.

Power take-off means 22 are connected from the tractor (not shown) to a rotatable shaft 24. The shaft 24 is rotatably supported on the supporting frame 26. The rotatable shaft 24 is operatively connected to a pulley 28 for imparting rotational movement thereto. The pulley 28 is preferably a V-shaped pulley using a V-shaped belt and it operatively drives a variable speed pulley 30. The speed of the pulley 30 is varied by varying the tension on the belt 32 so as to allow belt slippage on pulley 30. The variable speed pulley 30 is supported on bar 34 which is pivotally supported at pivotal connection 36. The pivotal support 36 is mounted on a member 38 which extends above the frame 26. A projection 40 having a slot therein 42 is upstandingly fixed to the frame 26. The rod 34 has a threaded pin 44 thereon which fits within the slot 42 for sliding movement. A nut threadedly engages threaded pin 44 of rod 34 for locking the pin 44 relative to the slot 42. The variable speed pulley 30 which is mounted on the rod 34 may then have its distance from pulley 28 varied by the pivotal movement of rod 34 about pivotal connection 36. As the distance between pulley 28 and pulley 30 is varied, the tension in belt 32 is likewise varied and therefore the degree of slippage between the pulleys is adjustably controlled. The variable speed pulley 30 consists of two concentric sections 50 and 52 which rotate synchronously on the same shaft 54. Therefore, while pulley 28 is driving section 52 of variable speed pulley 30, section 50 of pulley 30 is in turn driving pulley 58 by endless belt 60.

The pulley 58 is fixed on shaft 62 and drives the shaft 62 in response to the linear movement of belt 60. The shaft 62 has a pair of gears affixed thereon which are designated as 64. A pair of endless sprocket chains 66 and 68 are drivingly connected to the gear 64 and extend respectively to sprocket gears 70 and 72. The sprocket gear 70 is affixed on a rotatable shaft 74 which drives a wheel 76. Likewise, the sprocket gear 72 drives shaft 78 which in turn drives wheel 80.

Eccentrically and pivotally connected to wheel 76 at connection 82 are a pair of links 84 and 86. Pivotally suspended from the links are a pair of arms 88 and 90 which support agricultural implements such as hoes 92 at the bottom thereof. The arms 88 and 90 are further pivotally confined at connections 94 and 96 to the frame 26. Operatively connected to wheel 80 are similar links and arms. However, the eccentric pivotal connection on wheel 80 which is designated as 98 is shown to be 180° out of phase with the eccentric pivotal connection 82 on wheel 76.

A screw crank 100 is supported rotatably by the frame 26. A collar 102 is threadedly engaged with the screw crank 100. Depending from the collar 102 are wheels 104 which support the device 10 for rolling movement when pulled by the tractor (not shown). The wheels 104 are rotatably supported by arms 106 which depend from collar 102. The arms 106 are pivotally supported at approximately their midpoint as shown at 108. The arms 106 are confined to the support 26 by member 110. It will be seen, that rotational movement of screw crank 100 will result in the wheels 104 pivoting about the pivotal connection 108. The pivotal movement of wheel 104 about the pivotal connection 108 will vary the height about the ground of the agricultural implement 92.

In operation, a tractor (not shown) will pull the crop thinning device over four adjacent rows of plants. The power take-off means 22 will drive the rotatable shaft 24. The rotatable shaft 24 will in turn operate to drive pulley 28, pulley 30 and pulley 58. The driving speed of the pulleys may be adjusted in accordance with the desires of the tractor operator in accordance with the explanation given above involving rod 34. The pulley 58 in turn drives gears 64 which move sprocket chains 68 to turn sprocket gears 70 and 72. Wheels 80 and 76 turn in synchronism with the sprocket gears to oscillate the arms 88 and 90, etc., about the pivotal connections as 94. This oscillating movement of the agricultural implement 92 will thin the plants as the device is passing over the row. It is apparent that four rows are capable of being thinned simultaneously. The operator of the device will also be able to vary the depth of movement of the agricultural implement 92 by adjustment of the screw crank 100.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A crop thinning device adapted to be pulled by a tractor comprising a supporting frame, a rotatable shaft longitudinal of said frame, a variable speed pulley driven by said shaft, power take-off means connected to said tractor and operatively drivingly connected to said shaft, a pair of sprocket gears supported by said frame and driven by said variable speed pulley, a pair of links eccentrically and pivotally connected at a common point to each sprocket gear, an agricultural implement connected to each link for thinning a crop, said implement being connected to said link by a rod pivotally connected to a terminal portion of said link, said rod being pivotally secured intermediate its ends to said frame.

2. The combination of claim 1 wherein the eccentric pivotal connection between one pair of links and the sprocket gear differs by 180° from the connection between the other pair of the links and the other sprocket gear.

3. The combination of claim 1 including a slotted projection on said frame, a bar pivotally connected to said frame, a pin on said bar adapted to slide in said slot, means for adjustably locking said pin in said slot, said variable speed pulley carried by said bar, a belt driving said variable speed pulley whereby said speed of said pulley may be varied by varying the belt tension so as to introduce slippage between said pulley and said belt by the relative position of said projection in said slot.

4. A crop thinning device adapted to be pulled by a tractor comprising a supporting frame, a rotatable shaft longitudinal of said frame, a variable speed pulley driven by said shaft, power take-off means connected to said tractor and operatively drivingly connected to said shaft, a pair of sprocket gears supported by said frame and driven by said variable speed pulley, a pair of links eccentrically and pivotally connected at a common point to each sprocket gear, an agricultural implement connected to each link for thinning a crop, said implement being connected to said link by a rod pivotally connected to a terminal portion of said link, said rod being pivotally secured intermediate its ends to said frame, said supporting frame having a pair of adjustable screw cranks depending therefrom, wheels rotatably supported from said cranks for allowing the device to be pulled by a tractor, and a pair of clamps on the front portion of said frame for clamping said frame to a tractor drawbar.

References Cited in the file of this patent

UNITED STATES PATENTS

| | | |
|---|---|---|
| 2,043,075 | Smith | June 2, 1936 |
| 2,641,981 | Pilsner | June 16, 1953 |
| 2,791,952 | Coviello | May 14, 1957 |

FOREIGN PATENTS

| | | |
|---|---|---|
| 489,086 | France | Aug. 24, 1918 |
| 666,533 | Great Britain | Feb. 13, 1952 |